United States Patent
Odendall

(10) Patent No.: US 7,127,881 B2
(45) Date of Patent: Oct. 31, 2006

(54) METHOD FOR OPERATING A NITROGEN OXIDE STORAGE-TYPE CATALYTIC CONVERTER OF AN INTERNAL COMBUSTION ENGINE, PARTICULARLY OF A MOTOR VEHICLE

(75) Inventor: Bodo Odendall, Neuburg (DE)

(73) Assignee: Audi AG (DE)

( * ) Notice: Subject to any disclaimer, the term of this patent is extended or adjusted under 35 U.S.C. 154(b) by 0 days.

(21) Appl. No.: 10/539,420

(22) PCT Filed: Sep. 5, 2003

(86) PCT No.: PCT/EP03/09845

§ 371 (c)(1),
(2), (4) Date: Jun. 17, 2005

(87) PCT Pub. No.: WO2004/022952

PCT Pub. Date: Mar. 18, 2004

(65) Prior Publication Data

US 2006/0053781 A1    Mar. 16, 2006

(30) Foreign Application Priority Data

Jul. 9, 2002  (DE) ............................. 102 41 500

(51) Int. Cl.
*F01N 3/00* (2006.01)

(52) U.S. Cl. ..................... 60/285; 60/274; 60/276; 60/297; 60/301

(58) Field of Classification Search .............. 60/274, 60/276, 277, 285, 286, 295, 297, 301
See application file for complete search history.

(56) References Cited

U.S. PATENT DOCUMENTS

| | | | |
|---|---|---|---|
| 5,713,199 A * | 2/1998 | Takeshima et al. | 60/276 |
| 6,216,448 B1 * | 4/2001 | Schnaibel et al. | 60/274 |
| 6,216,451 B1 * | 4/2001 | Schnaibel et al. | 60/277 |
| 6,347,513 B1 * | 2/2002 | Pfleger et al. | 60/277 |
| 6,374,597 B1 * | 4/2002 | Bidner et al. | 60/285 |
| 6,497,092 B1 * | 12/2002 | Theis | 60/274 |

FOREIGN PATENT DOCUMENTS

| | | |
|---|---|---|
| DE | EP 0 997 617 | 5/2000 |
| DE | 100 39 709.3 | 8/2000 |
| DE | 100 03 612 | 8/2001 |
| DE | EP 1 193 376 | 4/2002 |
| JP | EP 1 061 245 | 12/2000 |
| JP | EP 1 167 712 | 1/2002 |

* cited by examiner

Primary Examiner—Binh Q. Tran
(74) Attorney, Agent, or Firm—Stevens, Davis, Miller & Mosher, LLP

(57) ABSTRACT

The invention relates to a process for operating a nitrogen oxide storage-type catalytic converter of an internal combustion engine, particularly of a motor vehicle, in which the nitrogen oxides which have been produced by the internal combustion engine are stored in the storage catalytic converter in the first operating phase (lean phase) as a storage phase for a specific storage time, and in which, after expiration of the storage time at a specific switching instant for a specific discharge time, switching to the second operating phase as the discharge phase takes place, in which the nitrogen oxides which were stored during the storage time are discharged from the storage catalytic converter, the Kat neu - catalytic converter new
Kat alt - catalytic converter old
Zeit - time switching instant in the storage phase being determined as a function of the nitrogen oxide slip as the difference between the nitrogen oxide mass flow which has flowed into the storage catalytic converter and the nitrogen oxide mass flow which has flowed out of the nitrogen oxide storage catalytic converter, each relative to the storage time. As claimed in the invention, to establish the switching instant from the storage phase to the discharge phase, the relative nitrogen oxide slip is determined such that the nitrogen oxide mass flow upstream of the nitrogen oxide storage catalytic converter and the nitrogen oxide mass flow downstream of the nitrogen oxide storage catalytic converter are each integrated over the time interval of the lean phase and the quotient of the integral values are brought into a relative relationship with a definable degree of conversion of the nitrogen oxide which can be derived from the exhaust gas boundary value, such that when this predetermined switching condition is present, switching from the storage phase to the discharge phase is carried out. In this way the fuel consumption can be reduced especially for a new storage catalytic converter using the full storage potential.

7 Claims, 3 Drawing Sheets

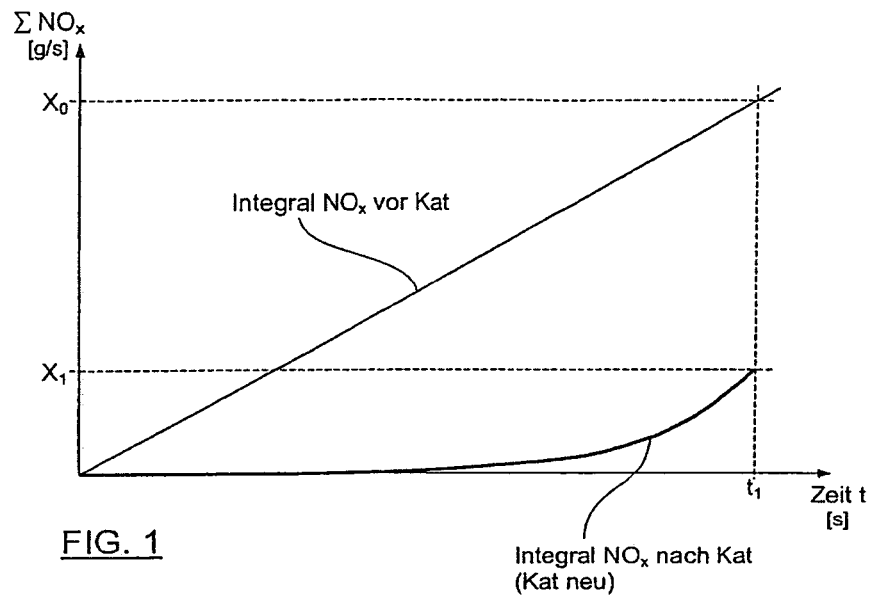
FIG. 1
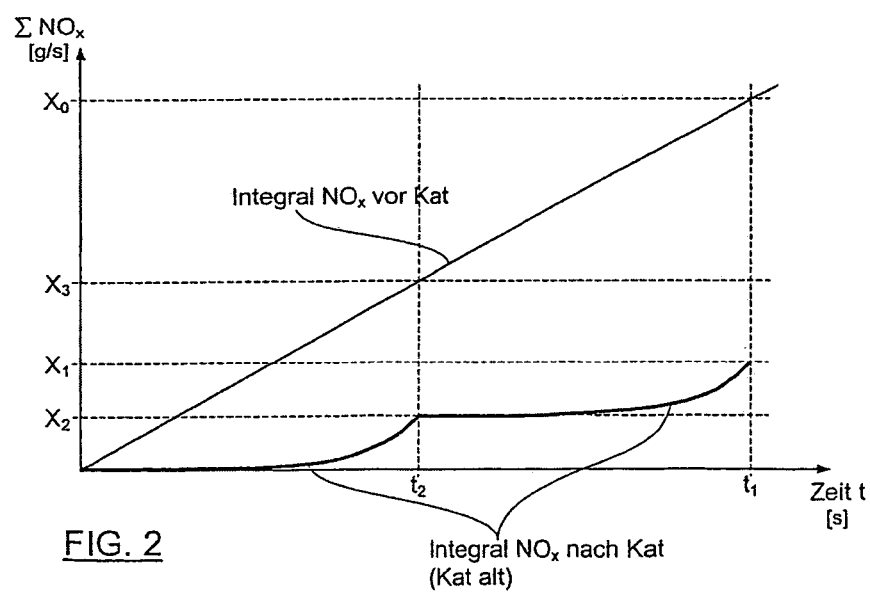
FIG. 2
FIG. 1
vor Kat - upstream of catalytic converter
nach Kat - downstream of catalytic converter
Zeit - time
(Kat neu) - (catalytic converter new)
FIG. 2
(Kat alt) - (catalytic converter old)

Kat neu - catalytic converter new
Kat alt - catalytic converter old
Zeit - time

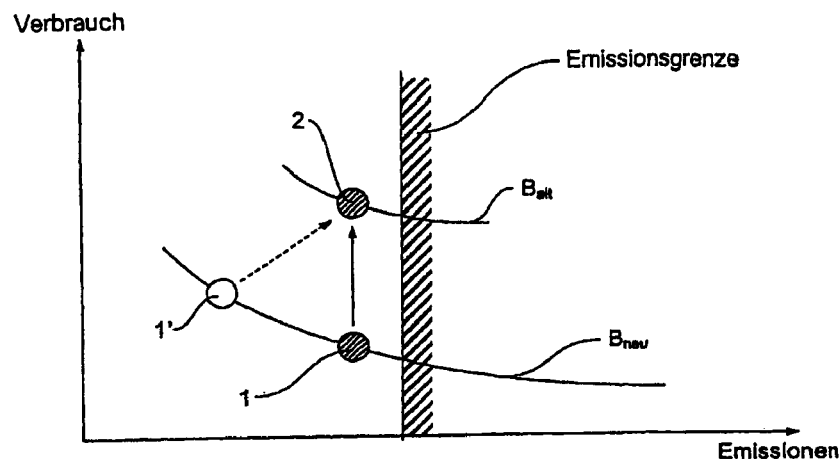
FIG. 4
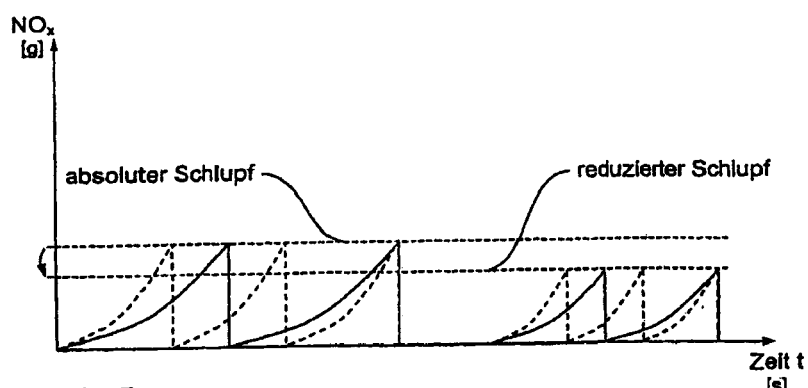
FIG. 5 (Stand der Technik)
FIG. 4
Verbrauch - consumption
Emissionsgrenze - emission limit
alt - old
neu - new
Emissionen - emissions
FIG. 5
absoluter Schlupf - absolute slip
reduzierter Schlupf - reduced slip
Zeit - time
Stand der Technik - prior art

US 7,127,881 B2

METHOD FOR OPERATING A NITROGEN OXIDE STORAGE-TYPE CATALYTIC CONVERTER OF AN INTERNAL COMBUSTION ENGINE, PARTICULARLY OF A MOTOR VEHICLE

This application is a § 371 application of PCT/EP03/009845, which claims priority from DE 10241500.5.

BACKGROUND

The invention relates to a method for operating a nitrogen oxide storage-type catalytic converter of an internal combustion engine, particularly of a motor vehicle.

In current automotive engineering spark ignition engines as internal combustion engines with direct gasoline injection instead of a conventional intake manifold injection are preferred, since these internal combustion engines, compared to conventional spark ignition engines, have distinctly more dynamics, are superior with respect to torque and output, and at the same time make possible a reduction in fuel consumption by up to 15%. This makes possible so-called stratification in the partial load range in which an ignitable mixture is required only in the area of the spark plug, while the remaining combustion chamber is filled with air. As a result the engine can be operated unthrottled; this leads to reduced load changes. In addition, the direct gasoline injector benefits from reduced heat losses since the air layers around the mixture cloud insulate toward the cylinder and cylinder head. Since conventional internal combustion engines, which work according to the intake manifold principle, as such a high air excess as prevails in direct gasoline injection can no longer be ignited, in this stratified charging mode the fuel mixture is concentrated around the spark plug which is positioned centrally in the combustion chamber, while in the edge areas of the combustion chamber there is pure air. In order to be able to center the fuel mixture around the spark plug which is positioned centrally in the combustion chamber, a concerted air flow in the combustion chamber is necessary, a so-called tumble flow. In the process an intensive, roller-shaped flow is formed in the combustion chamber and the fuel is injected only in the last third of the upward motion of the piston. By the combination of the concerted air flow and the special geometry of the piston which has for example a pronounced fuel and flow depression, the especially finely atomized fuel is concentrated in a so-called "mixture ball" ideally around the spark plug and reliably ignites. The engine control provides for the respectively optimized adaptation of the injection parameters (point of injection time, fuel pressure).

These internal combustion engines can therefore be operated in lean operation for a correspondingly long time; this benefits fuel consumption overall, as has been described in the foregoing. This lean operation however entails the disadvantage that the nitrogen oxides (NOx) cannot be reduced in the lean exhaust gas of a 3-way catalytic converter. In order to keep the nitrogen oxide emissions within the scope of prescribed limits, for example of the Euro-IV limit value, nitrogen oxide storage catalytic converters are generally used in conjunction with these internal combustion engines. These nitrogen oxide storage catalytic converters are operated such that the nitrogen oxides produced by the internal combustion engine in the first operating phase as the lean operating phase are stored in the nitrogen oxide storage catalytic converter. This first operating phase or lean operating phase of the nitrogen oxide storage catalytic converter is also called the storage phase. As the length of the storage phase increases, the efficiency of the nitrogen oxide storage catalytic converter decreases; this leads to a rise in nitrogen oxide emissions downstream of the nitrogen oxide storage catalytic converter. The reduction in efficiency is caused by the increase of the nitrogen oxide fill level of the nitrogen oxide storage catalytic converter. The rise in nitrogen oxide emissions downstream of the nitrogen oxide storage catalytic converter can be monitored, and after a predeterminable threshold value is exceeded, a second operating phase of the nitrogen oxide storage catalytic converter, a so-called discharge phase, can be initiated. During this second operating phase a reducing agent can be added to the exhaust gas of the internal combustion engine and it reduces the stored nitrogen oxides to nitrogen and oxygen. The reducing agents are generally hydrocarbons (HC) and/or carbon monoxide (CO) which can be produced in the exhaust gas simply by a rich setting of the fuel/air mixture. Towards the end of the discharge phase most of the stored nitrogen oxide is reduced and less and less of the reducing agent which can reduce the nitrogen oxide to oxygen and nitrogen comes into contact with the nitrogen oxide. Towards the end of the discharge phase the proportion of the reducing agent in the exhaust gas downstream of the nitrogen oxide storage catalytic converter therefore rises. By corresponding analysis of the exhaust gas downstream of the nitrogen oxide storage catalytic converter, for example by means of an oxygen sensor, the end of the discharge phase can be initiated and it is possible to switch back to the lean operating phase. In known nitrogen oxide storage catalytic converters this switching is carried out at time intervals of for example from 30 to 60 seconds, regeneration, i.e., the discharge phase, lasting approximately 2 to 4 seconds.

To determine a quality factor for evaluation of the storage capacity of a nitrogen oxide storage catalytic converter, WO 02/14658A1 discloses a process in which during the storage phase the raw nitrogen oxide mass flow upstream of the nitrogen oxide storage catalytic converter and a nitrogen oxide mass flow downstream of the nitrogen oxide storage catalytic converter are determined and the state of the nitrogen oxide storage catalytic converter is determined from the two determined values for the raw nitrogen oxide mass flow upstream and the nitrogen oxide mass flow downstream of the nitrogen oxide storage catalytic converter. For this purpose, the two determined values for the raw nitrogen oxide mass flow upstream and the nitrogen oxide mass flow downstream of the nitrogen oxide storage catalytic converter are each integrated over a predetermined time interval and the state of the nitrogen oxide storage catalytic converter is determined by the quotient from the integrated values for the raw nitrogen oxide mass flow upstream and the nitrogen oxide mass flow downstream of the nitrogen oxide storage catalytic converter. In this way, the quality factor is obtained which enables a conclusion about the storage capacity of the nitrogen oxide storage catalytic converter with respect to catalytic converter aging by sulfur poisoning and thermal damage or the ageing-induced decrease of the storage capacity. In particular, in this way the degree of poisoning of the catalytic converter with sulfur will be determined and thus the sulfur content will be corrected in the control device of the internal combustion engine in order to optimize sulfur regeneration. This is because the sulfur which is contained in fuels leads to poisoning of the storage catalytic converter, i.e., to permanent storage of the sulfur in the storage catalytic converter which reduces the storage capacity for the nitrogen oxides. In the nitrogen oxide storage catalytic converter the nitrogen oxides are stored in the form of nitrates, while the sulfur is stored in the form of sulfates. Since the sulfates are chemically more stable than the nitrates, the sulfate cannot break down in nitrogen oxide regeneration. Only for catalytic converter temperatures above 650° C. under reducing conditions can sulfur discharge can be achieved. These high catalytic converter temperatures are however generally not reached in urban driving so that mainly in city traffic does creeping attachment of sulfur in the nitrogen oxide storage catalytic converter occur, which leads to ageing of the nitrogen oxide storage catalytic converter. This ageing must therefore always be considered in the design and operation of a nitrogen oxide storage catalytic converter in order to ensure that catalytic converter ageing over the intended service life of the catalytic converter leads to adherence to predetermined exhaust gas limit values with respect to nitrogen oxide emissions for an aged nitrogen oxide storage catalytic converter. A generic process for operating a nitrogen oxide storage catalytic converter of an internal combustion engine of a motor vehicle is in general already known, in which the nitrogen oxides which have been produced by the internal combustion engine are stored in the nitrogen oxide storage catalytic converter in the first operating phase (lean phase) as a storage phase for a specific storage time, and in which, after expiration of the storage time at a specific switching instant for a specific discharge time, switching to the second operating phase as the discharge phase takes place, in which the nitrogen oxides which were stored during the storage time are discharged from the nitrogen oxide storage catalytic converter. The switching instant in the storage phase is determined as a function of the nitrogen oxide slip as the difference between the nitrogen oxide mass flow which has flowed into the nitrogen oxide storage catalytic converter and the nitrogen oxide mass flow which has flowed out of the nitrogen oxide storage catalytic converter, each relative to the storage time.

Specifically, in order to be able to adhere to the predetermined exhaust gas limit value over the entire service life of the nitrogen oxide storage catalytic converter, in such an operating mode the number of discharges must be matched to the amount of nitrogen oxide which has been discharged per charging and discharging cycle, such that for the storage capacity of an aged nitrogen oxide storage catalytic converter which has been reduced compared to a new nitrogen oxide storage catalytic converter, the amount of nitrogen oxide which has been released during the exhaust gas test time interval does not exceed the predetermined exhaust gas limit value. This amount of nitrogen oxide release which is predetermined per charging cycle for an aged storage catalytic converter is an absolute quantity and constitutes the absolute nitrogen oxide slip, i.e., that as soon as the storage catalytic converter is charged with this amount of nitrogen oxide, discharge takes place. This absolute nitrogen oxide slip as a fixed value applies both to the new and also the aged nitrogen oxide storage catalytic converter.

Since a rich mixture of lambda greater than 1 per discharge is required, with an increasing number of discharges in the course of ageing of a storage catalytic converter, the fuel consumption also rises compared to that of a new storage catalytic converter.

The object of the invention is therefore to make available a process for operating a nitrogen oxide storage catalytic converter with which the fuel consumption especially for new storage catalytic converters can be reduced.

SUMMARY OF THE INVENTION

To establish the instant of switching from the storage phase to the discharge phase, the relative nitrogen oxide slip is determined such that the nitrogen oxide mass flow upstream of the nitrogen oxide storage catalytic converter and the nitrogen oxide mass flow downstream of the nitrogen oxide storage catalytic converter are each integrated over the respective time interval of the lean phase and the quotient of the integral values are brought into a relative relationship with a predeterminable degree of conversion of the nitrogen oxide which can be derived from the exhaust gas limit value, such that when this predetermined switching condition is present, switching from the storage phase to the discharge phase is carried out at the switching instant which has been optimized with respect to fuel consumption and storage potential.

Advantageously, here the time integrals of the amount of nitrogen oxide upstream and downstream of the nitrogen oxide storage catalytic converter, which integrals have been brought into a relative relationship to one another, in conjunction with a predeterminable degree of conversion are taken into account as the reference value for switching. This means that for this discharge strategy the tail pipe emissions with respect to nitrogen oxide are independent of the ageing state of the catalytic converter, and furthermore the exhaust gas result is also independent of the number of discharges per unit of time. With this operating mode the respective storage capacity in the catalytic converter can advantageously be fully used; for a new or newer catalytic converter this is reflected in fuel consumption which is reduced compared to an aged storage catalytic converter, since the new or newer catalytic converter needs to be discharged less often than an aged catalytic converter, since the relative slip at which discharge is to be carried out is reached only at a later instant than is the case for an aged storage catalytic converter. For an aged storage catalytic converter in the operating mode as claimed in the invention, only the number of discharges rises, their being however independent of the exhaust gas result as such. This is because with the operating mode as claimed in the invention discharge is always carried out only when this becomes necessary, in order not to exceed the predetermined exhaust gas limit value per unit of time, since the integrated nitrogen oxide mass flows upstream and downstream of the nitrogen oxide storage catalytic converter here are referenced to the degree of conversion which is necessary for adherence to an exhaust gas limit value. In contrast to the operating mode according to the prior art, based on the use of the full storage potential a new storage catalytic converter viewed over a specific time interval need be discharged less often than is the case for a new storage catalytic converter as claimed in the prior art, in which the storage potential of a new storage catalytic converter cannot be fully exploited. This is because in the operating mode as claimed in the prior art this absolute amount of nitrogen oxide slip which is predetermined per discharge applies as a fixed value both to the old and also to the new storage catalytic converter, so that the new storage catalytic converter in the prior art must also always be discharged when this pre-established absolute nitrogen oxide slip is reached, this being the case although here the new nitrogen oxide storage catalytic converter could still continue to store nitrogen oxide. In contrast to this, in the operating mode as claimed in the invention the total instantaneous storage potential is always used up by the relative relationship, so that especially referenced to a new or newer storage catalytic converter a considerable fuel savings is achieved compared to the operating mode in the prior art. This is because in the operating mode according to the prior art, due to the fact that in a new or newer storage catalytic converter, discharge is always initiated earlier than necessary, also a rich mixture is added earlier than necessary.

According to an especially preferred process implementation, it is provided that the relative slip is the quotient of the integral over the nitrogen oxide mass flow downstream of the nitrogen oxide catalytic converter and the integral over the nitrogen oxide mass flow upstream of the nitrogen oxide storage catalytic converter. This quotient for determining the switching condition is set equal to a predeterminable switching threshold value K which is attributed to the predeterminable degree of nitrogen oxide conversion, so that when this switching condition is satisfied, switching from the storage phase at the end of the storage time which has been determined in this way to the discharge phase takes place. For example, this switching threshold value K satisfies the following equation:

K=1−predetermined conversion rate of nitrogen oxide

The predetermined nitrogen oxide conversion rate is thus always less than 1, but is preferably at least 0.8, at most preferably with respect to the Euro-IV exhaust gas limit value standard approximately 0.95.

The nitrogen oxide mass flow is modeled upstream of the nitrogen oxide storage catalytic converter. As a rule however this nitrogen oxide mass flow could also be measured upstream of the nitrogen oxide storage catalytic converter, for example by means of a nitrogen oxide sensor. This nitrogen oxide sensor as claimed in claim 5 is however advantageously provided downstream of the nitrogen oxide storage catalytic converter in order to measure the nitrogen oxide mass flow downstream of the nitrogen oxide storage catalytic converter. Especially for the times in which the nitrogen oxide sensor is not ready for operation, the nitrogen oxide mass flow downstream of the nitrogen oxide storage catalytic converter can also be modeled. Modeling is defined here as the raw nitrogen oxide mass flow upstream of the nitrogen oxide storage catalytic converter or the nitrogen oxide mass flow downstream of the nitrogen oxide storage catalytic converter being taken from the nitrogen oxide storage model or a nitrogen oxide raw emission model. In the models for example the raw nitrogen oxide mass flow is modeled from the parameters which describe the operating point of the internal combustion engine, for example, the supplied fuel mass or air mass, the torque, etc. Likewise, the modeled raw nitrogen oxide mass flow can also be taken from a characteristic or a family of characteristics.

According to one especially preferred embodiment, a nitrogen oxide mass flow signal which has been measured by means of the nitrogen oxide sensor downstream of the nitrogen oxide storage catalytic converter is supplied to a control device in which the nitrogen oxide mass flow which has been measured downstream of the nitrogen oxide storage catalytic converter is integrated over time, and the integral value which has been determined in this way together with the integral value of the nitrogen oxide mass flow upstream of the nitrogen oxide storage catalytic converter is brought into a relation with the predeterminable degree of conversion of the nitrogen oxide to determine the switching instant. When the switching condition is present, then the control device delivers a control signal to carry out switching of the nitrogen oxide storage catalytic converter from the storage phase to the discharge phase. The process implementation as claimed in the invention here thus also results in an especially favorable component engineering cost, since no additional components are necessary, but the components which are already present can be used for the operating mode as claimed in the invention.

The advantages of the control device which accrue hereby have already been detailed in conjunction with the process implementation so that they are not further detailed here.

BRIEF DESCRIPTION OF THE DRAWINGS

The invention will be explained in greater detail below with the aid of the drawings in which FIG. 1 shows a diagram of the amount of nitrogen oxide over time for a new nitrogen oxide storage catalytic converter, FIG. 2 shows a schematic diagram of the amount of nitrogen oxide over time for an aged nitrogen oxide storage catalytic converter, FIG. 4 shows a schematic diagram of the consumption over emissions with application lines for a new and an aged nitrogen oxide storage catalytic converter in comparison, and FIG. 5 shows a schematic of the amount of nitrogen oxide over time for an operating mode according to the prior art.

DETAILED DESCRIPTION OF THE INVENTIONS

Figure 3:
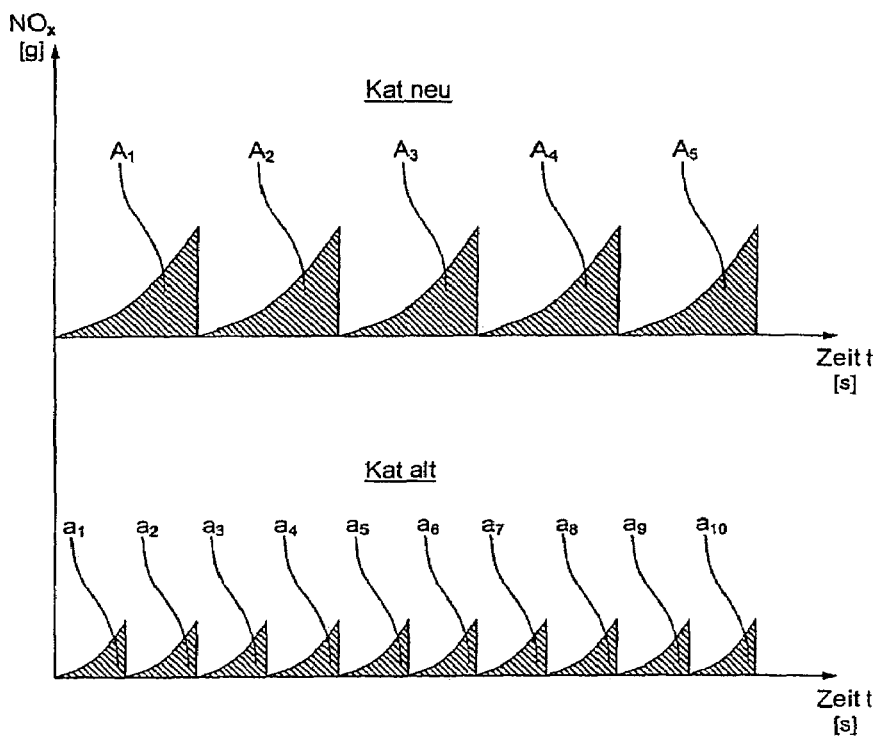
FIG. 3 shows a comparative schematic of the discharge cycles of a new and an aged nitrogen oxide storage catalytic converter.

FIG. 5 shows a schematic of the amount of nitrogen oxide over time for the operating mode of a nitrogen oxide storage catalytic converter according to the prior art. In the left part of the diagram relative to the fixed absolute nitrogen oxide slip the maximum storage time is shown, with the solid lines for the new storage catalytic converter and broken lines for the aged storage catalytic converter. It is shown purely schematically here that the number of discharges in an aged storage catalytic converter is higher, so that, since each time a more or less identical amount of nitrogen oxides is stored per unit of time, during a specific time interval for an aged nitrogen oxide catalytic converter a higher amount of nitrogen oxide is released than is the case during the same time interval for the new storage catalytic converter. This leads to the number of discharges per time interval being included directly in the exhaust gas result here and thus with reference to adherence to the exhaust gas limit values per predetermined exhaust gas limit value-time unit, to the number of possible discharges of an aged storage catalytic converter at the end of its service life having to be considered and therefore the fixed absolute slip value having to be reduced accordingly in order to meet the exhaust gas standard. This is shown schematically in the right part of the diagram and thus leads to the storage potential of the new storage catalytic converter not being used up. Since however in this operating mode, based on the fixed absolute slip, in a new storage catalytic converter the discharge is initiated earlier than is actually necessary, this has a deleterious effect on fuel consumption in the new storage catalytic converter, since a richer mixture is added earlier than necessary. This means that relative to a specific time interval actually more rich mixture is added than would have been necessary during this time interval if the storage capacity of a new or newer storage catalytic converter which is actually available would have been completely used up.

In FIGS. 1 and 2, simply for the sake of illustrating the principle of the specific procedure as claimed in the invention, the amount of nitrogen oxide is plotted schematically and by way of example over time, the amount of nitrogen oxide being shown added up. On the basis of constant delivery of a constant amount of nitrogen oxide over time which is assumed solely for sake of simplicity of illustration, the integral over the nitrogen oxide mass flow upstream of the nitrogen oxide storage catalytic converter over the time interval under consideration yields a linear rise, as is shown schematically in FIGS. 1 and 2. For a new nitrogen oxide storage catalytic converter, the full storage capacity is still present, i.e., for example poisoning by sulfur has not yet taken place, so that for a storage time $t_1$ nitrogen oxides are stored in the nitrogen oxide storage catalytic converter until the quotient of the integral over the nitrogen oxide mass flow downstream of the nitrogen oxide storage catalytic converter and of the integral over the nitrogen oxide mass flow upstream of the nitrogen oxide storage catalytic converter is equal to a predetermined switching threshold value K which has been derived from the exhaust gas limit value and which originates from a predetermined degree of nitrogen oxide conversion which is derived from the exhaust gas limit value, so that when this switching condition is satisfied, after expiration of the storage time $t_1$ switching takes place to a discharge phase which is no longer shown here, in which a rich mixture is supplied for discharge of the nitrogen oxides. For example, the switching threshold value K at a predetermined rate of nitrogen oxide conversion of 95%, i.e., of 0.95, is then 0.05 relative to 1 (100%) as the reference quantity. This means that in the present case of a new nitrogen oxide storage catalytic converter the discharge phase is initiated when the quotient of the two aforementioned integrals is equal to 0.05 or 5%.

FIG. 2 shows essentially the same for an aged nitrogen oxide storage catalytic converter, i.e., for a nitrogen oxide storage catalytic converter which is for example already highly poisoned with sulfur. As becomes apparent from the sample representation of FIG. 2 which is only schematic, for such an aged nitrogen oxide storage catalytic converter within the same time interval $t_1$ considered, for example only two discharges are necessary, once after a time $t_2$ which is prior to time $t_1$, and then in turn at time $t_1$ which corresponds to time $t_1$ of FIG. 1. The relative slip as the quotient of the integral over the nitrogen oxide mass flow downstream and upstream of the nitrogen oxide storage catalytic converter and relating it to a stipulated degree of nitrogen oxide conversion which can be derived from the exhaust gas limit value result in that at the switching instant at which the switching condition is satisfied, the quotient of the integral values $X_2$ and $X_3$ at time $t_2$ and the quotient of the integral values $X_1$ and $X_0$ at time $t_1$ as well as the quotient from the difference of the integral values $X_1-X_2$ and $X_0-X_3$ at time $t_1$ are always equal to the predetermined switching threshold value K. Likewise, the quotient of the integral values $X_1$ and $X_0$ at time $t_1$ (switching instant) corresponds to FIG. 1, i.e., for a new nitrogen oxide storage catalytic converter, corresponds to this switching threshold value K so that it is always ensured by the reference to the degree of conversion of the nitrogen oxide as claimed in the invention that a discharge takes place when this is necessary to satisfy the degree of conversion which originates from a specific exhaust gas limit value. That is to say, the storage capacity which is present in the nitrogen oxide storage catalytic converter can be fully used up according to the ageing state of the nitrogen oxide storage catalytic converter.

As shown especially in FIG. 3, the procedure as claimed in the invention results in that the exhaust gas limit value always being maintained since the number of discharges rises with increasing ageing of the catalytic converter, but this has no effect at all on the amounts of exhaust gas as such, since the number of discharges at each ageing instant is adapted optimally to the required conversion rate and thus the predetermined exhaust gas limit value, such that this exhaust gas limit value and thus the required conversion rate per exhaust gas limit value-time interval are not exceeded. Thus the amount of exhaust gas which is shown cross-hatched and which is released per discharge process on the upper x-axis in FIG. 3 as the sum corresponds to the exhaust gas amounts $A_1, A_2, A_3, A_4$, and $A_5$, here for the special case of a constant operating point of the internal combustion engine $A_1=A_2=A_3=A_4=A_5$, exactly the amount of exhaust gas plotted on the lower x-axis as the sum of areas $a_1$ to $a_{10}$, here too for the special case of a constant operating point of the internal combustion engine $a_1=a_2=a_3=\ldots=a_{10}$. Moreover, here the sum of the area integrals of the downstream catalytic converter emissions for a new and for an aged storage catalytic converter is almost the same.

That is to say that, viewed over the same time interval for an aged nitrogen oxide storage catalytic converter, only the number of discharges rises, but not the amount of nitrogen oxide released during this time interval, so that a predetermined emission limit value as the exhaust gas limit value can thus always be maintained.

The advantage of the procedure as claimed in the invention also appears in the diagram of fuel consumption over emissions, shown in FIG. 4. In this diagram, on the one hand the operating line as the application line $B_{new}$ for a new nitrogen oxide storage catalytic converter and the operating line as the application line $B_{old}$ for an aged nitrogen oxide storage catalytic converter are shown. This diagram shows that in the process implementation as claimed in the invention the nitrogen oxide storage catalytic converter is possible as is shown in FIG. 4 by reference numeral 1, with low consumption without holding catalytic converter ageing in abeyance, as is the case in the process implementation according to the generic prior art and as is shown in FIG. 4 with 1' and by the broken line, so that in the course of catalytic converter ageing due to the increased number of discharges the consumption does rise, but the emission boundary is not exceeded. In contrast to the operating mode according to the prior art, in the operating mode as claimed in the invention the exhaust gas result for a new storage catalytic converter is "poorer", but is permanently below the predetermined exhaust gas limit value. This means that with the operating mode as claimed in the invention an always optimized operating mode is possible without the occurrence of unnecessarily holding in abeyance at the new storage catalytic converter.

The invention claimed is:

1. Method for operating a nitrogen oxide storage-type catalytic converter of an internal combustion engine comprising:
   storing nitrogen oxides in a nitrogen oxide storage catalytic converter in a first operating phase (lean phase) as a storage phase for a specific storage time,
   after expiration of the storage time at a specific switching instant for a specific discharge time, switching to a second operating phase as the discharge phase takes place, in which the nitrogen oxides which were stored during the storage time are discharged from the nitrogen oxide storage catalytic converter, determining the switching instant in the storage phase as a function of the nitrogen oxide slip as the difference between the nitrogen oxide mass flow which has flowed into the nitrogen oxide storage catalytic converter and the nitrogen oxide mass flow which has flowed out of the nitrogen oxide storage catalytic converter, each relative to the storage time, establishing the switching instant from the storage phase to the discharge phase in which a relative nitrogen oxide slip is determined such that the nitrogen oxide mass flow upstream of the nitrogen oxide storage catalytic converter and the nitrogen oxide mass flow downstream of the nitrogen oxide storage catalytic converter are each integrated over the time interval of the lean phase and the quotient of the integral values are brought into a relative relationship with a predeterminable degree of conversion of the nitrogen oxide which has been derived from the exhaust gas limit value, such that when this predetermined switching condition is present, switching from the storage phase to the discharge phase is carried out at the switching instant which has been optimized with respect to fuel consumption and storage potential.

2. The process as claimed in claim 1, wherein the relative slip is the quotient of the integral over the nitrogen oxide mass flow downstream of the nitrogen oxide catalytic converter and the integral over the nitrogen oxide mass flow upstream of the nitrogen oxide storage catalytic converter, and wherein this quotient for determining the switching condition is set equal to a predeterminable switching threshold value K which originates from the predeterminable degree of conversion of nitrogen oxide, so that when this switching condition is satisfied, switching from the storage phase at the end of the storage time which has been determined in this way to the discharge phase takes place.

3. The process as claimed in claim 2, wherein the switching threshold value K satisfies the following equation:

$$K=1-\text{predetermined conversion rate of nitrogen oxide}$$

with a predetermined conversion rate of nitrogen oxide of less than 1, preferably with a predetermined conversion rate of nitrogen oxide of at least 0.80, at most preferably 0.95.

4. The process as claimed in claim 1, wherein the nitrogen oxide mass flow is modeled upstream of the nitrogen oxide storage catalytic converter.

5. The process as claimed in claim 1, wherein the nitrogen oxide mass flow is measured downstream of the nitrogen oxide storage catalytic converter by means of a nitrogen oxide sensor.

6. The process as claimed in claim 5, wherein a nitrogen oxide mass flow signal which has been measured by means of the nitrogen oxide sensor downstream of the nitrogen oxide storage catalytic converter is supplied to a control device in which the nitrogen oxide mass flow which has been measured downstream of the nitrogen oxide storage catalytic converter is integrated over time, and the integral value which has been determined in this way together with the integral value of the nitrogen oxide mass flow upstream of the nitrogen oxide storage catalytic converter is brought into a relation with the predeterminable degree of conversion of the nitrogen oxide to determine the switching instant, when the switching condition is present the control device delivering a control signal for switching of the nitrogen oxide storage catalytic converter from the storage phase to the discharge phase.

7. Control device for use in a process as claimed in claim 1, which controls the storage of the nitrogen oxides produced by the internal combustion engine in a first operating phase (lean phase) as the storage phase for a specific storage time in the nitrogen oxide storage catalytic converter, and which, after expiration of the storage time at a specific switching instant for a specific discharge time, switches the nitrogen oxide storage catalytic converter to the second operating phase as the discharge phase to discharge the nitrogen oxides which were stored during the storage time from the nitrogen oxide storage catalytic converter, the control device determining the switching instant in the storage phase as a function of the nitrogen oxide slip as the difference between the nitrogen oxide mass flow which has flowed into the nitrogen oxide storage catalytic converter and the nitrogen oxide mass flow which has flowed out of the nitrogen oxide storage catalytic converter, each relative to the storage time, wherein a nitrogen oxide mass flow signal which has been measured by means of a sensor, preferably a nitrogen oxide sensor downstream of the nitrogen oxide storage catalytic converter can be supplied to the control device to integrate the nitrogen oxide mass flow which has been measured downstream of the nitrogen oxide storage catalytic converter over time, and, wherein the quotient of the integral values of the nitrogen oxide mass flow upstream and downstream of the nitrogen oxide storage catalytic converter can be brought by the control device into a relative relation with the predeterminable degree of conversion of the nitrogen oxide which is derived from the exhaust gas limit value to determine the switching instant which is optimized with respect to fuel consumption and storage potential, when this predetermined switching condition is present the control device delivering a control signal for switching of the nitrogen oxide storage catalytic converter from the storage phase to the discharge phase.

* * * * *

UNITED STATES PATENT AND TRADEMARK OFFICE
CERTIFICATE OF CORRECTION

PATENT NO. : 7,127,881 B2
APPLICATION NO. : 10/539420
DATED : October 31, 2006
INVENTOR(S) : Bodo Odendall It is certified that error appears in the above-identified patent and that said Letters Patent is hereby corrected as shown below:

On The Title Page, Item (30) Foreign Application Priority Data, The priority data should be corrected to read --September 7, 2002 (DE) 102 41 500--.

Signed and Sealed this

Twenty-third Day of October, 2007

JON W. DUDAS
*Director of the United States Patent and Trademark Office*